United States Patent

[11] 3,584,783

| [72] | Inventor | Yasuhiro Kobori |
| | | Tokyo-to, Japan |
| [21] | Appl. No. | 784,637 |
| [22] | Filed | Dec. 18, 1968 |
| [45] | Patented | June 15, 1971 |
| [73] | Assignee | Kaijo Denki Kabushiki Kaisha |
| | | Tokyo-to, Japan |
| [32] | Priority | Dec. 20, 1967, Oct. 22, 1968 |
| [33] | | Japan |
| [31] | | 42/81147 and 43/76471 |

[54] VECTOR SYNTHESIZER FOR CONTINUOUSLY OBTAINING THE MAGNITUDE AND DIRECTION OF A VECTOR FROM THE ORTHOGONAL COMPONENTS OF THE VECTOR
5 Claims, 9 Drawing Figs.

[52] U.S. Cl................................................. 235/189,
235/186, 235/150.26
[51] Int. Cl.................................................. G06g 7/22
[50] Field of Search........................................ 235/186,
189, 190, 191, 192, 197, 150.26, 150.261, 150.27,
150.271, 150.272; 328/142

[56] References Cited
UNITED STATES PATENTS

| 3,312,932 | 4/1967 | Barber et al. | 235/189 X |
| 3,406,280 | 10/1968 | Vago | 235/186 X |
| 3,430,855 | 3/1968 | Hartwell et al. | 235/189 X |
| 3,473,011 | 10/1968 | Schmid | 235/189 X |
| 3,482,086 | 12/1969 | Caswell | 235/189 X |

Primary Examiner—Malcolm A. Morrison
Assistant Examiner—Joseph F. Ruggiero
Attorneys—Robert E. Burns and Emmanuel J. Lobato ABSTRACT: A vector synthesizer for obtaining the magnitude and direction of a vector from the Y-component and X-component of the vector, where the Y-component and X-component are converted respectively a first modulated signal and a second modulated signal the carrier of which has the same frequency as the carrier of the first modulated wave and a phase position advanced, by 90°, from the phase position of the carrier wave of the first modulated wave. The magnitude is obtained by detecting the envelope of a sum signal of the first modulated wave and of the second modulated wave. The direction is obtained by detecting the phase difference between the sum signal and the carrier of one of the first and second modulated waves.

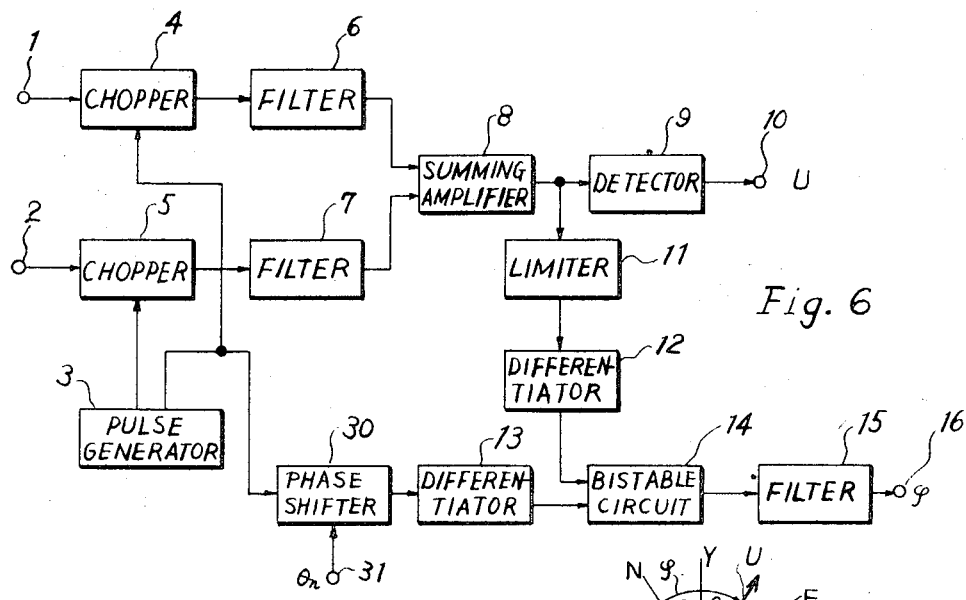
Fig. 6
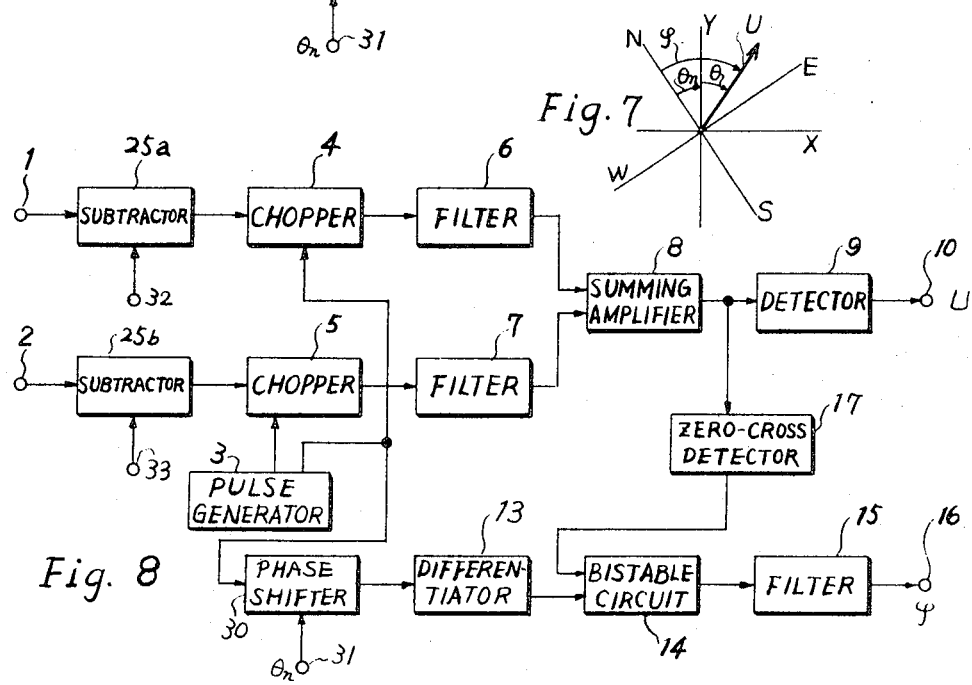
Fig. 7
Fig. 8

VECTOR SYNTHESIZER FOR CONTINUOUSLY OBTAINING THE MAGNITUDE AND DIRECTION OF A VECTOR FROM THE ORTHOGONAL COMPONENTS OF THE VECTOR

This invention relates to a vector synthesizer and more particularly to a vector synthesizer for obtaining the magnitude and direction of a vector from the X-component and Y-component of the vector.

In a conventional ultrasonic anemometer system, there are provided with two measuring systems each of which comprises a sending (electro-ultrasonic) transducer, a receiving (ultrasonic-electric) transducer, an oscillator for generating electric pulses of ultrasonic frequency wave to apply them to the sending transducer, and a receiving device for receiving and detecting ultrasonic pulses transmitted from the sending transducer at the output side of the receiving transducer. In this case, the transducers are arranged so that two transmission paths of the ultrasonic waves propagating from the sending transducers to the respective receiving transducers intersect at right angles with each other on a plane including the two transmission paths. Accordingly, if it is assumed that the two transmission paths are respectively X-axis and X-axis and the angle between the Y-axis and the direction of the wind is an angle $\theta$, the absolute value V of the velocity of the wind $\dot{v}$ and the angle $\theta$ can be indicated as follows by the use of the X-component X (i.e.; $V \sin \theta$) and Y-component Y (i.e.; $V \cos \theta$) respectively measured by the two measuring systems.

$$V = X^2 + Y^2 \quad (1)$$
$$= \tan^{-1} X/Y \quad (2)$$

In the conventional anemometer system, the absolute value $V$ of the velocity of the wind $\dot{v}$ and the angle $\theta$ indicating the direction of the wind are calculated with figures in accordance with the above equations (1) and (2) by the use of the $X$- and $Y$-components. However, it is very difficult to obtain successively respective instantaneous values of the value $V$ and the angle from the $X$- and $Y$-components unless an electronic computer is employed to perform the operation of the above equations (1) and (2).

In addition to this, continuous synthesization of orthogonal components of a vector the instantaneous magnitude and direction of which fluctuate momently is desirable. However, there have not yet been proposed a compact device capable of the above-mentioned operation.

An object of this invention is to provide a vector synthesizer capable of obtaining continuously the magnitude and direction of a vector, from orthogonal components of the vector, even if the instantaneous magnitude and the direction of the vector fluctuate momently.

The principle of this invention will be better understood from the following more detailed discussion taken in conjunction with the accompanying drawings, in which the same or equivalent parts are designated by the same reference numerals, characters and symbols, and in which:

FIGS. 4A, 4B and 7 are vector diagrams for describing the principle of this invention; and FIG. 5, 6 and 8 are block diagrams each illustrating another embodiment of this invention.

The principle of this invention will first be described. In the vector synthesizer of this invention, X-component X and Y-component Y obtained from the above-mentioned orthogonally arranged two measuring systems are applied respectively to two balanced modulators. In this case, two carrier waves having a phase difference of 90° from each other are respectively supplied to the two balanced modulators so that the component $Y$ modulates a carrier wave of $\sin \omega t$ and the component $X$ modulates a carrier wave of $\cos \omega t$; where the reference "$\omega$" is the angular frequency of the carrier wave. Accordingly, two carrier waves are amplitude-modulated in the two balanced modulators so that modulated outputs $Y \sin \omega t$ and $X \cos \omega t$ are produced from the two modulators respectively. The modulated outputs $Y \sin \omega t$ and $X \cos \omega t$ are combined in a summing amplifier so that a sum ($Y \sin \omega t + X \cos \omega t$) is obtained. This sum can be rewritten as follows:

$$Y \sin \omega t + X \cos \omega T = Y^2 + ^2 \sin(\omega t + \theta) \quad (3) = V \sin(\omega t + \theta)$$

where the angle $\theta$ is an angle measured from the component $Y$ to the value $V$. Accordingly, the absolute value $V$ of a resultant vector of the components $Y$ and $X$ can be detected in an envelope demodulator by detecting the envelope of the sum. The angle $\theta$ can be obtained by detecting the phase difference between the sum and the carrier wave of $\sin \omega t$.

Figure 1:
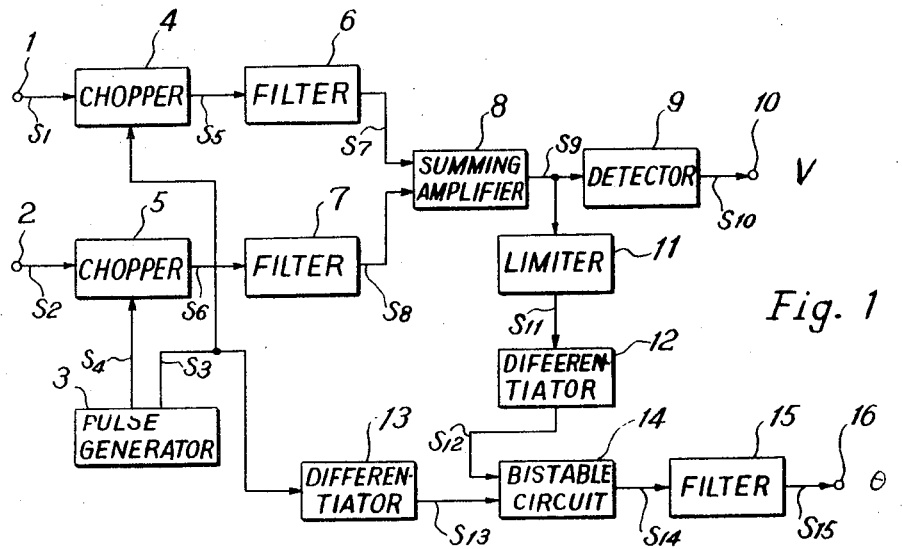
FIG. 1 is a block diagram for illustrating an embodiment of this invention.
Figure 2:
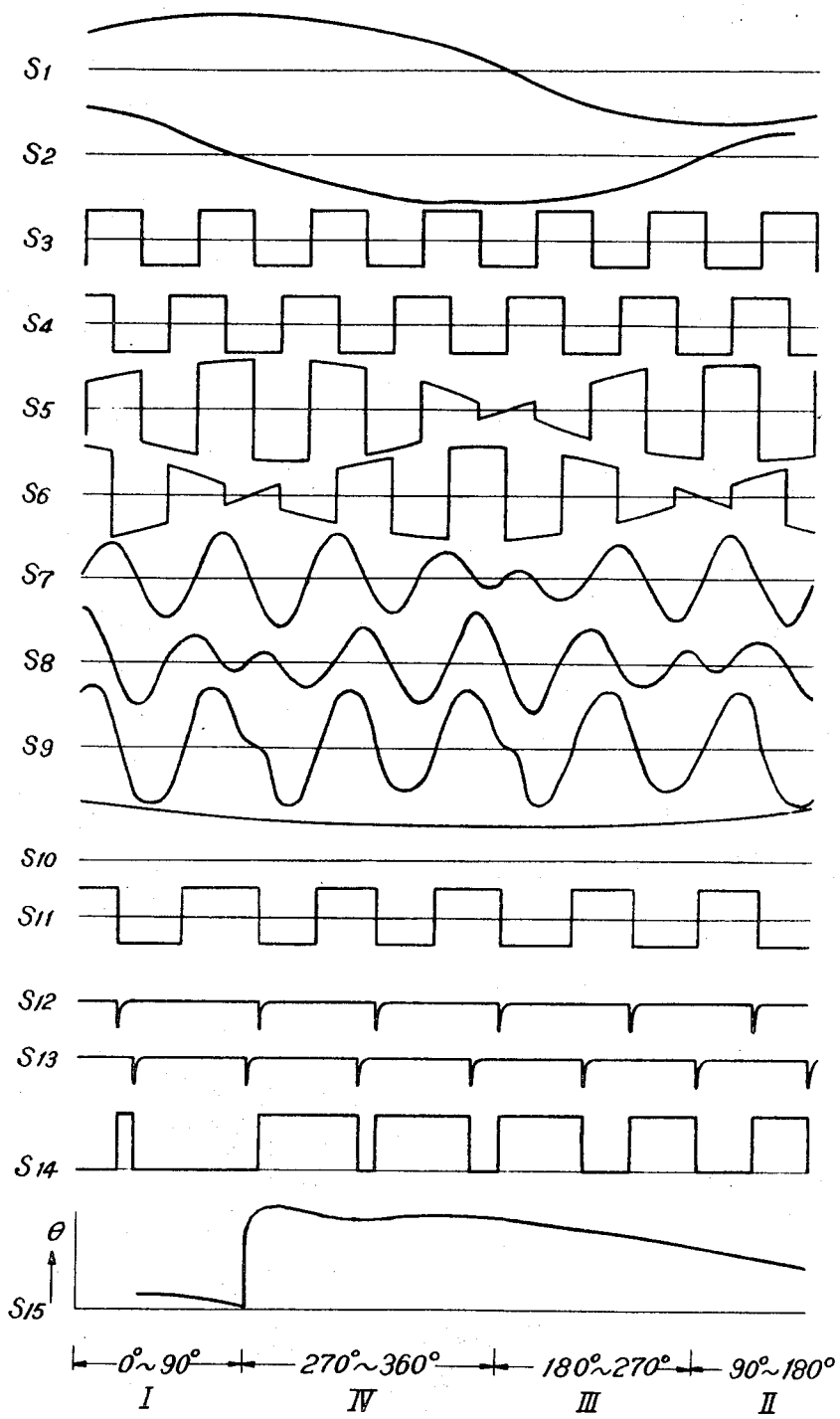
FIG. 2 show time charts for describing the operation of embodiments of this invention.

With reference to FIGS. 1 and 2, an embodiment of this invention is described. In the embodiment shown in FIG. 1, terminals 1 and 2 receive respectively signals corresponding to the components $Y$ and $X$. Choppers 4 and 5 are employed as the modulators together with filters 6 and 7. A pulse generator 3 generates two rectangular waves having a phase difference of 90° from each other. A summing amplifier 8 and a detector 9 are respectively employed as the summing amplifier and the envelope demodulator mentioned above. An amplitude limiter 11 and a differentiator 12 are employed as a zero-cross detector of the sum. A differentiator 13 is employed as a zero-cross detector of the carrier of $\sin \omega t$. Accordingly, a first output representative of the absolute value $V$ is obtained from an output terminal 10, and a second output representative of the angle $\theta$ is obtained from an output terminal 16 by detecting, at a bistable circuit 14 and a low-pass filter 15, the phase difference between zero-cross instants of the sum and the carrier of $\sin \omega t$ by the use of the outputs of the differentiators 12 and 13.

An example of the operation in the embodiment shown in FIG. 2 will be more detailed with reference to FIG. 2. FIG. 2 shows time charts of signals indicated in FIG. 1 by the same references in a case where the direction of a vector having the components $Y$ and $X$ rotates through the first quadrant I, the fourth quadrant IV, the third quadrant III and the second quadrant II on a plane including orthogonally arranged two measuring axes X and Y. Signals S1 and S2 are applied respectively from the terminal 1 and 2 as the components $Y$ and $X$ of a vector $\dot{v}$ measured by an orthogonally arranged two measuring systems. Signals s3 and s4 generated from the pulse generator 3 are respectively modulated at the choppers 4 and 5 by the signals S1 and S2, so that modulated signals S5 and S6 are obtained respectively from the choppers 4 and 5. Filters 6 and 7 are employed for eliminating higher harmonic components of the carrier waves S3 and S4 from the modulated waves S5 and S6, so that signal S7 and S8 i.e.; $Y \sin \omega t$ and $X \cos \omega t$ respectively) are obtained as outputs of the filters 6 and 7 respectively. These signals S7 and S8 are superposed together at the summing amplifier 8 so as to produce a signal S9 corresponding to the sum ($Y \sin \omega t + X \cos \omega t$). The envelope of the signal S9 s detected in a detector 9, so that a signal S10 is obtained at the terminal 10 as a signal the level of which is proportional to the absolute value $V$ of the vector $\dot{v}$ measured.

The limiter 11 is a saturated amplifier by way of example and converts the sum signal S9 to a rectangular wave S11. The differentiator 12 generates pulse signals S12 the time slots of which are synchronized with the transition instants from plus polarity to minus polarity of the rectangular signal S11. The differentiator 13 converts the rectangular signal S3 to pulse signals S13 the time slots of which are synchronized with the transition instants from plus polarity to minus polarity of the rectangular signal S3. The state of the bistable circuit 14 is set by each pulse of the pulse signals S12 and reset by each pulse of the pulse signals S13. Accordingly, a rectangular signal S14 is obtained from the bistable circuit 14. The duration of plus polarity of the rectangular signal S14 is determined by the phase difference between the sum signal S9 and the rectangular signal S3 (i.e.; the carrier of $\sin \omega t$). The rectangular signal S14 passes through the low-pass filter 14, so that a DC signal S15 is obtained at the output terminal 16. Since the instantaneous level of the DC signal S15 is proportional to the duration of plus polarity of the signal S14, this instantaneous level indicates as instantaneous angle between the measured vector and the Y-axis of the measuring system.

As mentioned above, the instantaneous magnitude and direction of a vector can be converted respectively electric signals and indicated on a meter or a pen recoder in accordance with this invention. Moreover, the device of this invention has simple construction. Accordingly, the device of this invention make the measurement of a momentarily fluctuated vector easy and convenient.

Figure 3:
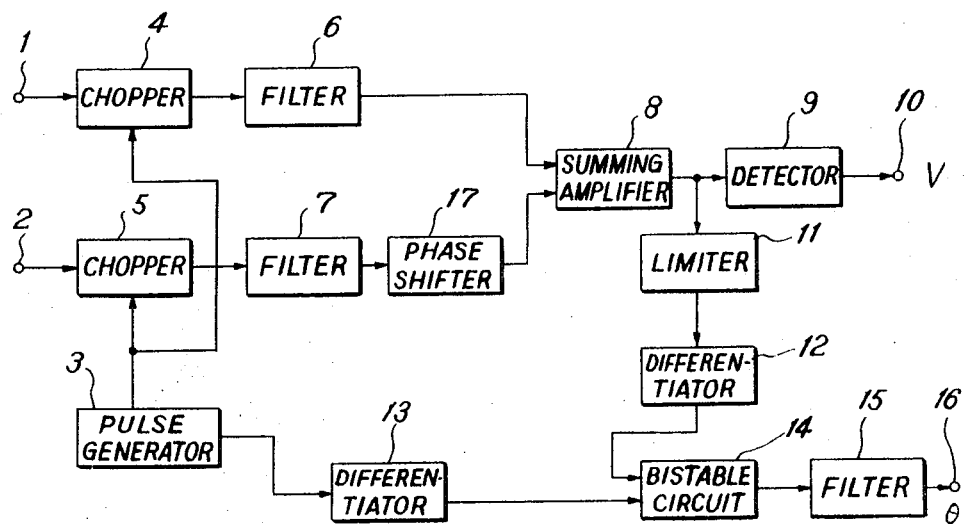
FIG. 3 is a block diagram for illustrating another embodiment of this invention.

FIG. 3 shows another embodiment of this invention, in which a carrier wave of rectangular signal is applied to both the choppers 4 and 5. The output signal of the filter 7 is shifted by 90° at a phase shifter 17 and combined at the summing amplifier 8 with the output signal of the filter 6. Other parts and operations are the same as those of the embodiment shown in FIG. 1.

Figure 4A:
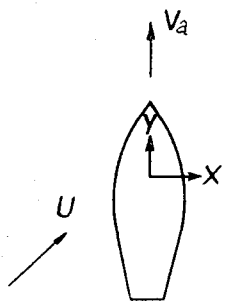
Figure 4B:
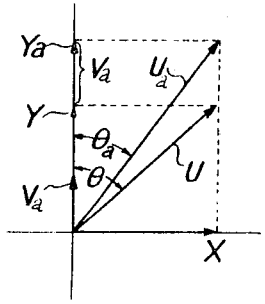

If the orthogonally arranged two measuring system is equipped on a moving device (e.g.; ship), the measured results are affected by errors caused by the moving velocity of the moving device. In this case, one (e.g.; Y) of the measured axes X and Y is arranged so as to coincide with the moving direction of the moving device as shown in FIG. 4A. In this case, if the vector U is measured by the above-mentioned embodiment, results Ua and $\theta a$ will be obtained since the true component Y is measured as a value Ya due to the existence of the moving velocity Va of the moving device as shown in FIG. 4. Accordingly, the angle $\theta$ is also measured as an angle $\theta a$. These errors can be eliminated by the embodiment shown in FIG. 5. Terminals 23 and 24 correspond respectively to terminals 1 and 2 of the embodiments shown in FIG. 1 and 2. In this embodiment, a synthesizer 26 is one of the above mentioned embodiments of this invention. X-component obtained from a X-axis system 21 is applied to the synthesizer 26 through the terminal 24, and a Y-component obtained at the Y-axis system 20 is applied to the synthesizer 26 through the terminal 23 and a subtractor 25. The output of the speed meter 22 known per se is applied to the subtractor 25 to subtract the velocity V from the component Y. Accordingly, true results U and $\theta$ can be obtained at output terminals 27 and 28 of the synthesizer.

The measuring axis Y on the moving device is usually deviated from the north. However, if the angle information measured from a predetermined direction (e.g.; north) is desirable, an embodiment shown in FIG. 6 can be employed. In this embodiment, a phase shifter 30 is provided to phase-shift the phase position of the carrier wave of $\sin \omega t$ by the use of the output $\theta n$ of a direction meter known per se. Accordingly on output indicative of the resultant angle $\Phi$ of the angles $\theta$ and $\theta n$ can be obtained at the output terminal 16. FIG. 7 is a vector diagram of vector U and angles $\theta$, $\theta n$ and $\Phi$.

Figure 5:
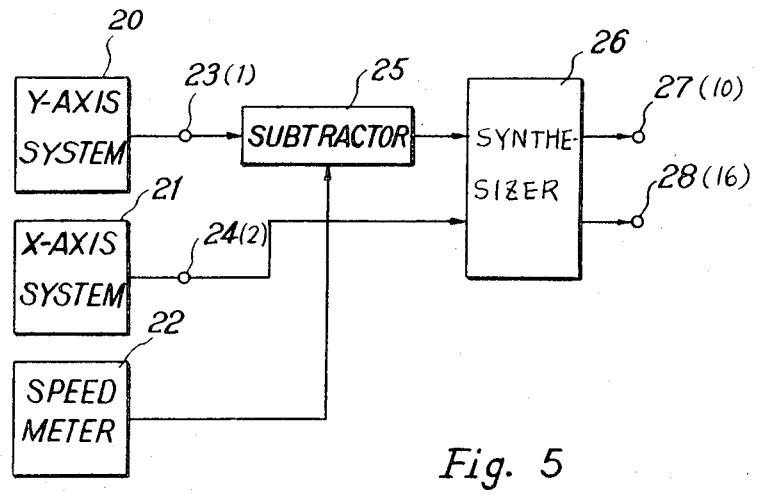

Moreover, if any of the measuring axes Y and X does not coincide with the moving direction of the moving device, an embodiment shown in FIG. 8 can be employed to eliminate errors in subtractors 25a and 25b similarly as the embodiment in FIG. 5. In this case, the Y-component of the moving velocity V of the moving device is applied to a terminal 32, and the X-component of the moving velocity V is applied to a terminal 33.

This invention is mainly mentioned above with respect to the measurement of a vector indicative of the magnitude and direction of the wind. However, this invention can be also applied to synthesize components of other vectors, such as outputs of a water current meter or outputs of a strain guage etc.

What I claim is:

1. A vector synthesizer for obtaining the magnitude and direction of a vector from an $X$-component and a $Y$-component of the vector, comprising, a first modulation means for amplitude-modulating a first carrier wave with a signal corresponding to an $Y$-component to produce a first modulated wave, a second modulation means for amplitude-modulating a second carrier wave with a signal corresponding to an $X$-component to produce a second modulated wave the second carrier of which has the same frequency as the first carrier of the first modulated wave and a phase position advanced, by 90°, from the phase position of the first carrier of the first modulated wave, a summing amplifier for superposing the first modulated wave and the second modulated wave so as to produce a sum signal, an envelope detector for detecting the envelope of the sum signal to produce a first output signal representative of the magnitude of the vector, difference detection means for detecting a phase difference between zero-crossing instants of the sum signal and of the carrier wave of the first modulated wave so as produce a second output signal representative of the direction of the vector, the difference detection means comprising a zero-crossing detector for detecting the zero-crossing instants from a first polarity to a second polarity of the sum signal so as to produce a first pulse train, a differentiator for producing pulses having time slots synchronized with the transition instants from the first polarity to the second polarity of the first carrier wave of the first modulated wave so as to produce a second pulse train, a bistable circuit set by each pulse of the first pulse train and reset by each pulse of the second pulse train, and a low-pass filter connected to the output of the bistable circuit to produce the second output signal.

2. A vector synthesizer according to a claim 1 in which a phase shifter is provided for shifting the time slots of pulses of the second pulse train.

3. A vector synthesizer for obtaining the magnitude and direction of a vector from an X-component and a Y-component of the vector, comprising:

generator means for generating a first and a second carrier wave, a first modulating means for amplitude-modulating the first carrier wave with a signal corresponding to a Y-component to produce a first modulated wave, a second modulation means for amplitude-modulating the second carrier wave by a signal corresponding to an X-component to produce a second modulated wave said second carrier of which has the same frequency as the first carrier of the first modulated wave and a phase position advanced by 90°, from the phase position of the first carrier of the first modulated wave, a summing amplifier connected to the first modulation means and the second modulation means for superposing the first modulated wave on the second modulated wave so as to produce a sum signal, an envelope detector connected to the summing amplifier for detecting the envelope of the sum signal to produce a first output signal representative of the magnitude of the vector, and difference detection means connected to the summing amplifier and the generator for detecting a phase difference between zero-crossing instants of the sum signal and of the carrier wave of the first modulated wave so as to produce a second output signal representative of the direction of the vector.

4. A vector synthesizer according to claim 3 in which a subtractor is further provided for subtracting, from the signal corresponding to the Y-component, an error component along the direction of the Y-component.

5. A vector synthesizer according to claim 3 in which a subtractor is further provided for subtracting, from the signal corresponding to the X-component, an error component along the direction of the X-component.